United States Patent [19]

Peterson

[11] Patent Number: 4,695,887
[45] Date of Patent: Sep. 22, 1987

[54] VARIABLE SPEED VIDEO CAMERA
[75] Inventor: Dean M. Peterson, Escondido, Calif.
[73] Assignee: Eastman Kodak Company, Rochester, N.Y.
[21] Appl. No.: 930,199
[22] Filed: Nov. 13, 1986
[51] Int. Cl.⁴ .................. H04N 5/225; G03B 9/10
[52] U.S. Cl. .................. 358/213.13; 358/225; 352/216
[58] Field of Search .................. 358/213.13, 225, 228; 352/216, 217

[56] References Cited

U.S. PATENT DOCUMENTS

| 3,300,271 | 1/1967  | Yamamoto       | 352/214    |
| 3,303,271 | 2/1967  | Hecker         | 178/5      |
| 3,490,835 | 1/1970  | Nemeth et al.  | 352/141    |
| 3,531,194 | 9/1970  | Roppel et al.  | 352/216    |
| 3,602,585 | 8/1971  | Steibl et al.  | 352/216    |
| 3,787,116 | 1/1974  | Shimizu        | 352/141    |
| 4,161,000 | 7/1979  | Cleveland      | 358/225    |
| 4,171,529 | 10/1979 | Silberberg et al. | 358/209 |
| 4,257,693 | 3/1981  | Hirata et al.  | 352/209    |
| 4,301,476 | 11/1981 | Keller et al.  | 358/209    |
| 4,471,388 | 9/1984  | Dischert       | 358/320    |
| 4,504,866 | 3/1985  | Saito          | 358/213    |
| 4,532,550 | 7/1985  | Bendell et al. | 358/213    |
| 4,545,659 | 10/1985 | Swinehart et al. | 352/216 |
| 4,551,763 | 11/1985 | Swinehart et al. | 358/225 |
| 4,566,029 | 1/1986  | Johnson        | 358/225    |
| 4,571,629 | 2/1986  | Horio et al.   | 358/225    |
| 4,597,015 | 6/1986  | Johnson        | 358/213.13 |
| 4,626,094 | 12/1986 | Saito          | 358/225    |
| 4,643,548 | 2/1987  | Swinehart      | 352/216    |
| 4,646,156 | 2/1987  | Lizuka         | 358/225    |
| 4,669,841 | 6/1987  | Kaneko         | 352/216    |

FOREIGN PATENT DOCUMENTS

| 3022786    | 1/1981  | Fed. Rep. of Germany . |            |
| 58-129882  | 8/1982  | Japan                  | 358/213.13 |
| 57-190427  | 11/1982 | Japan                  | 358/213.13 |
| 60-236586  | 11/1985 | Japan                  | 358/225    |

Primary Examiner—Gene Z. Rubinson
Assistant Examiner—L. C. Schroeder
Attorney, Agent, or Firm—William F. Noval

[57] ABSTRACT

A compact video camera which is operable at continuously variable shutter speeds to capture high speed events which may be recorded and played back in slow motion for scene analysis. The video camera includes an image sensor, a zoom lens, and a rotating shutter which is continuously adjustable to different shutter speeds. The camera components are dimensioned and configured in a compact design for easy-to-use hand-held operation. The shutter includes a pair of rotating shutter discs having openings which are selectively adjustable relative to each other to vary the interval during which the imager sensor is exposed to a scene projected onto it by the zoom lens. The shutter discs are mounted on a pair of spaced, hollow shafts. Adjustment of the relative rotational position of the two discs to control the size of the relative shutter opening is effected by a push rod linked to and slidably mounted within the hollow shafts. Axial movement of the push rod in response to a change in sensor signal intensity varies the opening defined by the two shutters.

4 Claims, 8 Drawing Figures

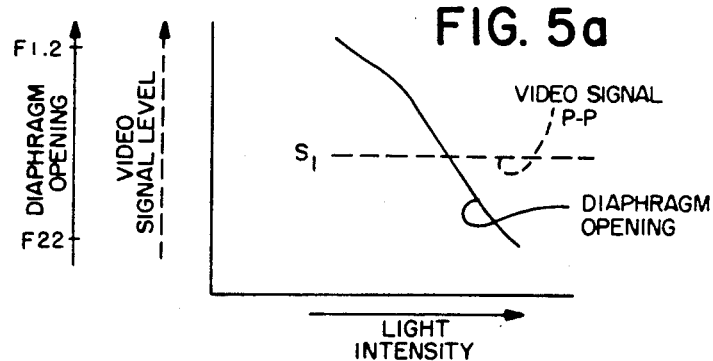
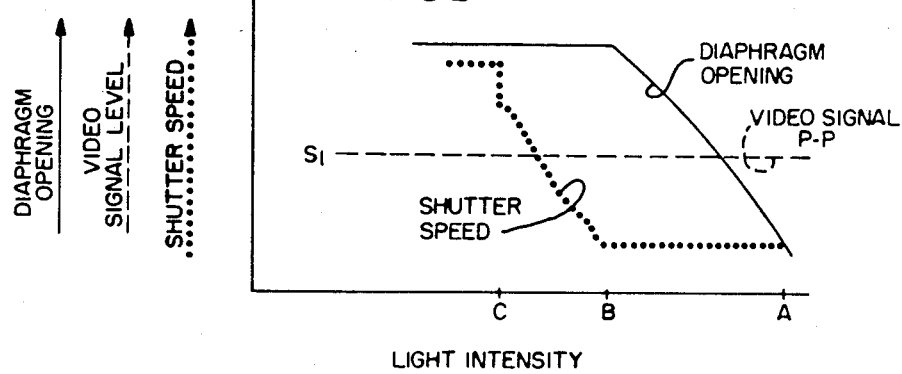

VARIABLE SPEED VIDEO CAMERA

BACKGROUND OF THE INVENTION

This invention relates in general to video apparatus capable of capturing fast moving events. More particularly, this invention relates to video apparatus including a compact, easy-to-use variable speed camera having a rotating shutter which is continuously variable over a wide range of shutter speeds.

The need often arises for recording high speed or rapidly changing scenes so that the scene may be played back in slow or stopped motion in order to analyze the scene. Where a standard video camera is used to record high speed events, the frame rate of the camera is too slow to stop the motion of the event. There is thus a likelihood of blurring of the recorded image so that analysis of the scene is difficult. Such analysis capabilities are for example, desirable in analyzing the motions of an athlete while engaged in an athletic event, such as football, baseball, golfing, or the like. Thus, it may be desirable to capture the motion of a swinging golf club in order to correct a defect in the golfer's swing. Stop action shots may be used in football games in order to analyze the correctness of a referee's call on a play, or to analyze the movements of a football player, such as those of a quarterback in throwing a football to a receiver. Although motion picture cameras have been used to analyze such athletic events, there have been problems since film is costly and the delay between filming and viewing is far too long to be useful for more than archival use. Although various video systems have been proposed which would obviate these objectives to the use of film by reducing recording media cost and making playback instantly available through a television monitor, the video systems have been expensive, heavy, bulky, and hard to use. Moreover, where manually adjustable shuttered video cameras have been proposed, the possibility existed that a specific high speed event is not captured because an inadequate shutter speed has been chosen by the camera operator.

SUMMARY OF THE INVENTION

According to the present invention, there is provided video apparatus which includes a variable speed video camera for capturing high speed events. The camera includes a rotating shutter having an opening which is continuously adjustable to vary the speed of exposure of an imager. The dimensions and configuration of a zoom lens, the rotating shutter and the imager are such as to make the camera compact, lightweight and easy to handle.

According to an aspect of the invention, the rotating shutter includes a pair of shutter discs, each of which has a pair of openings which are alignable with the imager of the camera. The discs are mounted on respective hollow shafts which have axes of rotation which coincide but are spaced from each other. A push rod is coaxial with the two shutters and slidably mounted within the hollow shafts. One of the hollow shafts is driven at a constant speed by a motor and is linked to the push rod by a helical linkage arrangement. The other hollow shaft is slidably but nonrotationally linked to the push rod. An automatic shutter control is provided such that the opening which exposes the imager to a scene is varied by sliding the push rod relative to the axis of rotation of the two shutter discs.

BRIEF DESCRIPTION OF THE DRAWINGS

In the following description of the drawings, like elements are numbered with like numbers.

FIGS. 5a–5b are respective graphs illustrating the operation of the high speed video camera of FIG. 2;

DESCRIPTION OF THE PREFERRED EMBODIMENT

Figure 1:
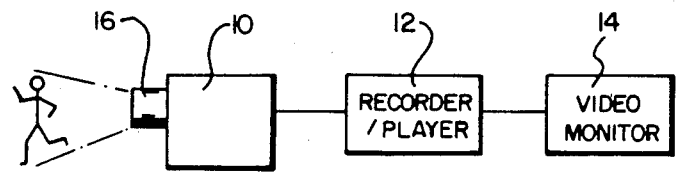
FIG. 1 is a block diagram of a high speed video system.

Referring now to the Figures, there is shown preferred embodiments of the invention. In FIG. 1, a video system for recording high speed events and for playing them back at slow or stopped motion is shown and includes a high speed video camera 10, a video cassette recorder/player 12, and a video monitor 14. Video camera 10 is a compact video camera which converts the image of a scene into a video signal. As will be explained in more detail later, the video camera 10 includes, in a compact, easy to use configuration a zoom lens 16, an imager 20, (such as a CCD or MOS solid state imager) for converting the image of a scene into a video signal, and a compact rotary shutter arrangement 22 located between zoom lens 16 and imager 20 for controlling the interval of exposure of the imager during each video field or frame. Camera 10 and recorder/player 12 may be separate units or may be combined into a so-called "Camcorder".

Figure 3:
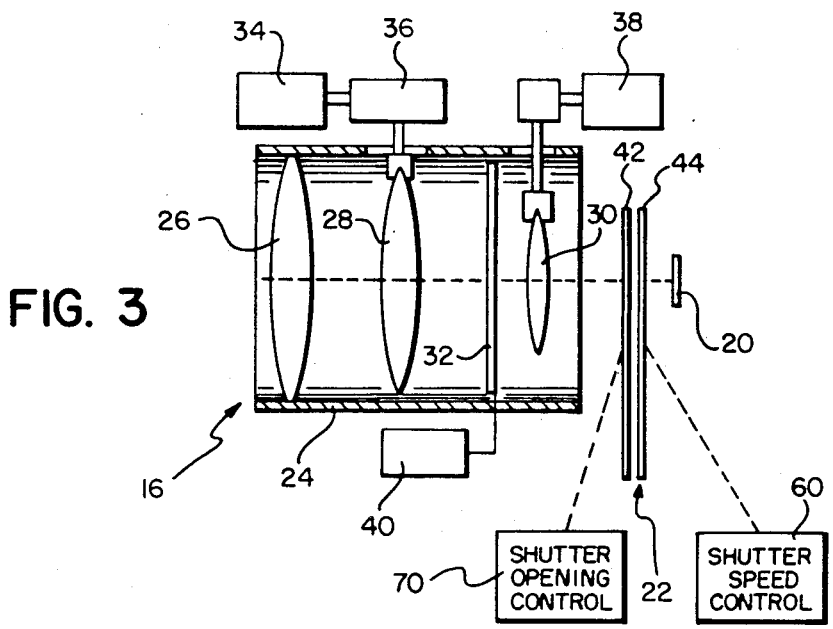
FIGS. 3 and 4 are respectively a top plan and a frontal view of the compact configuration of the major components of the camera of FIGS. 1 and 2.
Figure 4:
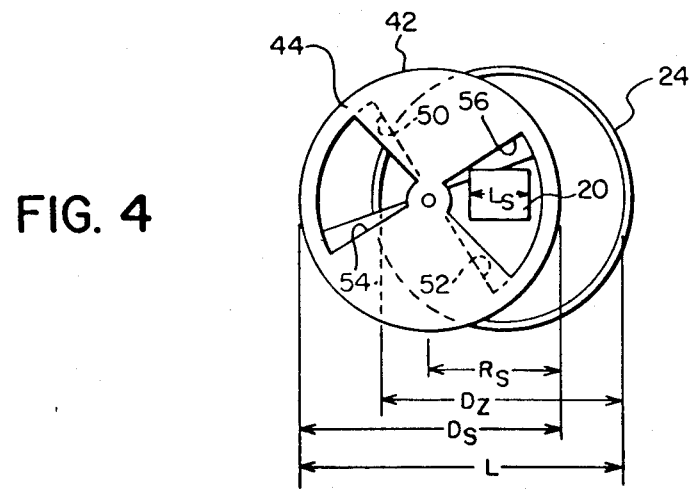

Referring now to FIG. 3 and 4, there is shown the compact configuration of the major components of camera 10 to provide a lightweight, easy to use camera for use in field conditions such as at athletic events or the like. Camera 10 includes a zoom lens barrel 24 including a front optical assembly 26, an intermediate movable optical assembly 28, and a rear optical assembly 30. A variable diaphragm 32 is positioned between optical assemblies 28 and 30. A zoom motor 34 is coupled to lens assembly 28 by means of gear assembly 36 and responds to zoom lens control signals to move assembly 28 either to the left or right (as shown in FIG. 3) to change the zoom ratio of the zoom lens 16. An automatic focus motor 38 is provided to move lens assembly 30 to the left or right in order to maintain the image projected onto imager 20 in focus through automatic focus control signals produced in a well known manner. An aperture control motor 40 is linked in a suitable manner to variable aperture 32 to change the opening of aperture 32 in order to control the light intensity of an image which is projected onto imager 20. Motors 34, 38, and 40 and associated linkages are dimensioned to make camera 16 as compact as possible.

Variable speed shutter 22 includes rotatable shutter discs 42 and 44 each of which has a pair of opposed sector shaped openings 50, 52 and 54, 56 (see FIG. 4). Openings 50 and 54 and 52 and 56 are alignable with imager 20. Shutter discs 42 and 44 are rotated at the same rotational speed (by shutter speed control 60) but are rotationally adjustable with respect to each other (by shutter opening control 70) so that the shutter opening positions may be varied to vary the speed of exposure of imager 20 to an image projected onto it by zoom lens 16.

As shown in FIG. 4, the diameter $D_S$ of shutter discs 42 and 44 and the diameter $D_Z$ of zoom lens barrel 24 are dimensionally similar. Moreover, the radius $R_O$ of shutter openings 50-56, the length $L_S$ of sensor 20 and the radius $R_S$ of shutter discs 42 and 44 are dimensioned to make the combination of camera components compact for easy operator handling. As an example, if sensor 20 has a length $L_S$ of $\frac{1}{2}''$, the radius $R_O$ of openings 50-56 is chosen to be somewhat greater and the overall diameter $D_S$ of shutters 42, 44 may be 2 inches or less. If the diameter of zoom lens barrel 24 is also about 2 inches, the lateral dimension L is less than $1\frac{1}{2}$ times the dimension of either the lens barrel or the shutter. This is in contrast to known shutters which are substantially (8× or 10×) larger than the focal plane dimension of the sensor or film.

Figure 6:
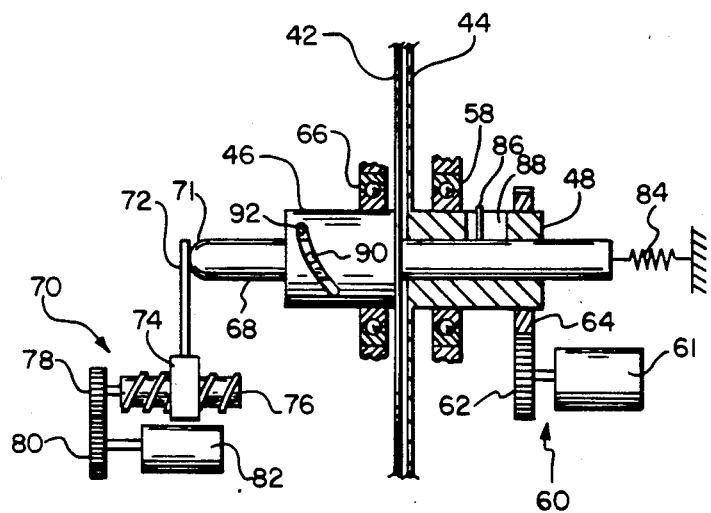
FIG. 6 is a partially sectional diagrammatic view of an embodiment of a variable speed shutter according to the present invention.

Referring now to FIG. 6, there is shown an embodiment of a variable speed camera including one arrangement for rotatably adjusting shutter discs 42 and 44. As shown, disc 44 fixed to hollow shaft 48 is rotatably mounted in bearing 58 and is driven by shutter speed control 60 which includes motor 61 and gears 62 and 64. As will be described in more detail later, disc 44 is rotated at a speed that is related to the video field rate of camera 10 and to the number of openings in disc 44. Since disc 44 has two openings which are sequentially brought into alignment with the imager 20, disc 44 is rotated at a speed of 30 rotations per second for the NTSC field rate of 60 fields per second. Shutter disc 42 is fixed to hollow shaft 46 which is rotatably mounted in bearing 66. The axes of rotation of spaced shafts 48 and 46 are conincident. A push rod 68 is rotatably mounted within shafts 46 and 48 and is axially slidable by means of shutter opening control 70. Control 70 includes an actuator member 72 which engages end 71 of push rod 68. Member 72 is mounted on follower 74 which is driven by helical gear 76 and gear pairs 78 and 80 by means of a reversible motor 82. Push rod 68 is biased against member 72 by a spring 84.

Push rod 68 is mounted for relative axial movement with respect to hollow shaft 48 by means of a pin 86 fixed to rod 68. Pin 86 is constrained from radial movement but is slidable axially within slot 88 of shaft 48. Rod 68 is concurrently movable both slidably and rotationally with respect to hollow shaft 46 by means of pin 90 fixed to rod 68 which projects into helical slot 92 in shaft 46.

Movement of rod 68 to the right or left (as shown in FIG. 6) by means of control 70 causes pin 90 to move in helical slot 92. As pin 90 follows in slot 92, rod 68 will be rotated. As rod 68 is moved both axially and rotationally, pin 86 moves axially in slot 88 and rotates shaft 48 and shutter 44. Openings 50-56 in shutters 42 and 44 will be moved relative to each other thereby increasing or decreasing the relative shutter opening and thereby the interval during which sensor 20 is exposed to an image.

Figure 7:
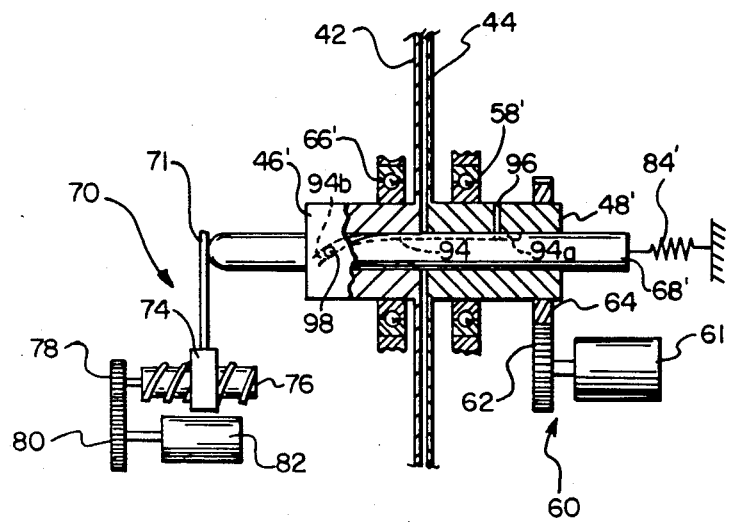
FIG. 7 is a partially sectional diagrammatic view of another embodiment of shutter according to the present invention.

Another embodiment of shutter arrangement according to the present invention is shown in FIG. 7. As shown, shutters 42 and 44 are mounted on hollow shafts 46' and 48' which are rotatably mounted respectively in bearings 66' and 58' and which have coincident axes of rotation. A push rod 68' is axially mounted in shafts 46' and 48' and has in its outer surface a slot which extends axially in the region of shaft 48' and disc 44 and helically in the region of shaft 46' and disc 42'. A pin 96 fixed to shaft 48' extends into axial segment 94a of slot 94 and a second pin 98 fixed to shaft 46' extends into the helical segment 94b of slot 94. When shaft 68' is slid within shafts 46' and 48' by control 70, pin 96 will follow in axial slot segment 94a and pin 98 will follow in helical slot segment 94b in rod 68'. This will cause relative movement of shutter discs 42' and 44' with respect to each other in order to increase or decrease the relative shutter opening and shutter speed.

Figure 2:
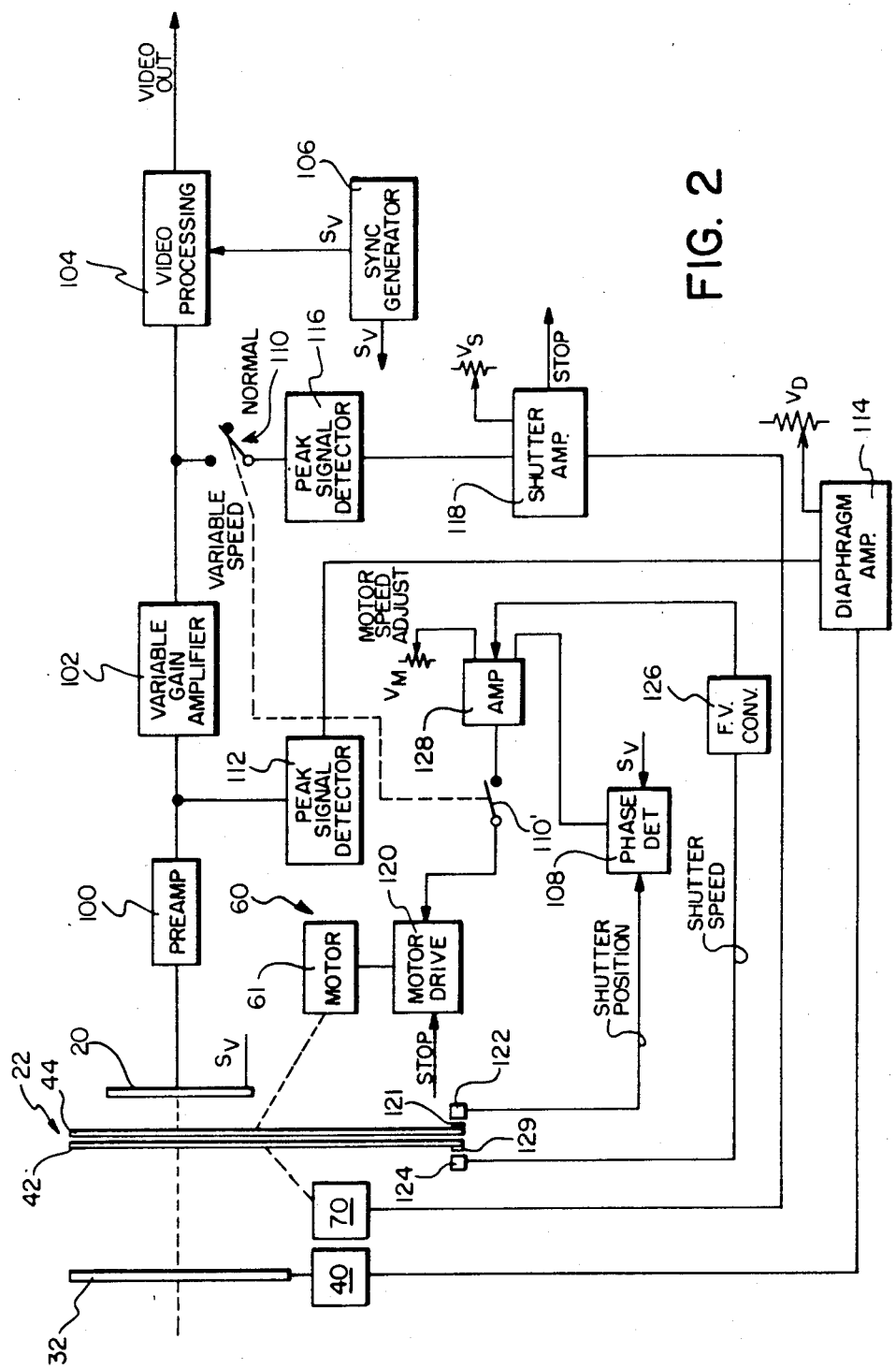
FIG. 2 is a partially diagrammatic, partially schematic view of a high speed video camera, according to a preferred embodiment of the present invention.

As shown in FIG. 2, the video signal produced by imager 20 is amplified by preamplifier 100 and a variable gain amplifier 102. Video processing circuit 104 converts the signal from amplifier 102 into an NTSC composite video signal for feed to the recorder/player 12. A sync generator 106 provides various synchronizing and blanking signals such as a vertical sync signal $S_V$ which is supplied to imager 20, video processing circuit 104 and as a reference signal to the phase detector 108.

Camera 10 is selectively operable in a normal mode or a variable speed mode. In the normal mode, shutter 22 is stationary and control of the intensity of an image on imager 20 is effected solely by means of variable diaphragm 32. In the variable speed mode, both the intensity of light and the interval of exposure within a field interval is controlled by means of variable diaphragm 32 and variable shutter 22. A switch 110 is operable by the camera operator to effect one of the modes of operation.

In the normal mode of operation, shutter 22 is stationary and apertures 54, 50 or 56, 52 of shutter discs 42 and 44 are aligned with imager 20 to allow the full image to be projected upon imager 20. A peak signal detector 112 measures the signal after it has been amplified by preamplifier 100 and the detected signal is compared to a reference voltage $V_D$ in diaphragm differential amplifier 114. When the camera is not in use, diaphragm 32 is fully closed in order to prevent damage to imager 20 from excessively bright light. During camera operation, the intensity of light on imager 20 is controlled so that the video signal is maintained at a predetermined peak to peak value (typically 1 volt P-P). Thus, if the light intensity is low, diaphragm 32 will be opened more widely in order to allow more light to fall on imager 20. Conversely, if the intensity of light from the scene is high diaphragm 32 will be closed down to a small aperture in order to maintain the proper signal level. Thus, diaphragm control circuitry maintains a constant intensity of light on imager 20.

This mode of operation is illustrated in FIG. 5a, which depicts a graph of light intensity versus diaphragm opening and video signal level. The video signal level is shown in dashed lines as held constant at a level $S_1$ (e.g., 1 volt peak to peak). As the light intensity decreases, the diaphragm opening is increased. This is depicted in the solid line graph labeled "diaphragm opening". As illustrated, the f stop increases from f/22 to f/1.2 as light intensity decreases.

The variable speed mode integrates control of the variable aperture 32 with the variable shutter 22 to effect stop motion imaging of fast moving or changing events. In this mode, the fastest shutter speed is always set automatically in order to relieve the camera operator of the necessity of manually changing shutter speeds according to varying scene action changes. This provides the operator with a wider range of options in operating the camera. Moreover, as the light intensity of a scene diminishes, the peak to peak signal level is maintained constant by first controlling the variable aperture and then controlling the variable shutter. This assures the fastest shutter speed despite varying scene brightness.

This is shown in FIG. 5b in which the peak to peak video signal level is represented by a constant signal level dashed line. In the variable speed shutter mode the fastest shutter speed is maintained for given light conditions and the diaphragm is controlled in order to maintain a constant peak to peak video signal. Thus, as the scene brightness is varied over the range A to B, the shutter speed is maintained at its fastest speed, such as 1/10,000 sec. while the diaphragm opening is varied between a minimum and maximum range. This is depicted by the sloping solid line for the diaphragm opening and the horizontal dotted line for the shutter speed. If the scene brightness should decrease below level B, the diaphragm opening will be maintained at the maximum open position and the variable shutter will be controlled to decrease shutter speed until the light intensity or scene brightness C is reached. At this level, the relative angle of opening of the shutter disc openings is at a maximum (i.e., the openings are aligned) variable shutter 22 no longer capable of being adjusted. At this point, shutter discs 42 and 44 are stopped with the maximum shutter opening aligned with imager 20. The effective shutter speed then becomes the field rate of the camera (e.g., 1/60 sec). As scene brightness continues to decrease either the peak-to-peak video signal range lessens or the gain of variable gain amplifier 102 is increased.

Referring now to FIG. 2, there is shown circuitry for controlling the variable speed shutter 22. Closing of switch 110 connects peak signal detector 116 to the output of variable gain amplifier 102. The peak signal is detected and applied to a shutter differential amplifier 114 which compares the peak signal to a reference signal $V_S$. If the peak signal is below the reference level, a control voltage will be applied to shutter control 70 to vary the relative position of shutter disc 42 with respect to shutter disc 44. As described above, a control signal is produced by differential amplifier 114 only when the light intensity drops below level B in FIG. 5b. For light intensities above level B, the shutter speed is maintained at the fastest shutter speed that variable shutter 22 is capable. Thus, the smallest relative opening between a pair of openings 50, 54 or 52, 56 of discs 42 or 44 is effected.

For light intensities above level B, the peak to peak video signal level will be maintained by varying aperture 32. The control loop response relating to aperture control is faster than the control loop response relating to shutter control so that the aperture opening will be varied before shutter speed is varied.

As the light intensity decreases from level B to level C, the shutter discs 42 and 44 are rotated so as to open the effective aperture until the maximum shutter opening is attained with shutter openings 50, 54 and 52, 56 being aligned. This minimum shutter speed is limited by the angle of sector openings 50–56. For example if an opening (50–56) in disc 42, 44 has an angle of 60°, then the minimum shutter speed is 1/180 sec (i.e. 60°/180°×1/60 sec.).

At this level of light intensity, shutter amplifer 118 will produce a stop signal which is applied to shutter motor driven 120 to stop the shutter discs 42 and 44 so that aligned apertures 50, 54, or 52, 56 are coextensive with imager 20. At this light intensity level, the maintenance of the peak to peak video signal at a constant level will be difficult unless, as explained above, automatic gain control is effected to increase the gain of amplifier 102 as the detected output signal from amplifier 102 decreases.

The circuit of FIG. 2 also includes a shutter speed control circuit 60 for maintaining the rotational speed of shutter discs 42 and 44 at a predetermined value and for synchronizing the phasing of the effective opening of discs 42 and 44 with the vertical sync of the video signal. Disc 44 is provided with a position indicator 121 which is detected by detector 122 to produce a shutter position signal. This signal is compared to the vertical sync signal by phase detector 108 and any variation produces a voltage which adjusts the relative positioning of discs 42 and 44 with respect to the vertical sync signal. Disc 42 is provided with a speed indicator 123 which is detected by detector 124 to produce a signal which is converted by frequency to voltage converter 126 into a voltage which is compared in amplifier 128 with a motor speed reference voltage $V_M$. The voltage produced by amplifier 128 is applied to motor driver 120 to control the speed of motor 61 and of discs 42 and 44.

Although the variable speed shutter/variable diaphragm control system of FIG. 2 has been described with respect to specific mechanisms for adjusting the relative positioning of discs 42 and 44 it will be appreciated that other adjusting systems are contemplated within the scope of the present invention. Thus discs 42 and 44 could be driven by separate drive motors with separate motor control and phase control circuits.

The invention has been described in detail with particular reference to preferred embodiments thereof, but it will be understood that variations and modifications can be effected within the spirit and scope of the present invention.

What is claimed is:

1. A variable speed video camera comprising:
an image sensor;
first and second shutter discs, each of which has opening means which are alignable with said image sensor;
first and second hollow shaft means for respectively rotatably mounting said first and second shutter discs, said first and second shaft means having axes of rotation which coincide but are spaced from each other so as to mount said first and second shutter discs at a fixed distance with respect to each other;
a push rod which is mounted coaxially with the axes of rotation of said first and second shutter discs and which is axially slidably mounted within said first and second hollow shaft means;
first linkage means for linking said first shutter disc with said first hollow shaft means such that said push rod is constrained against rotation with respect to said first shutter disc and first hollow shaft means but is axially slidable with respect thereto;
second linkage means for connecting said push rod with said second hollow shaft means such that said push rod is movable in concurrent axial and rotational movement with respect to said second hollow shaft means in a helical locus of movement;

means connected to one of said first or second hollow shaft means for rotating said hollow shaft means at a fixed rotational speed wherein rotation of said first or second shaft means is transmitted to said push rod and to said other of said first and second shaft means by said first and second linkage means so that said first and second shutter discs are rotated at said rotational speed; and means for slidably moving said push rod within said first and second hollow shaft means in order to vary the rotational position of said first and second shutter discs with respect to each other, thereby to vary the relative opening between said first and second opening means to vary the speed of said shutter.

2. The camera of claim 1 wherein said first hollow shaft means includes an axial slot and wherein said first linkage means comprises a pin which is fixed to said push rod and which extends into said slot and wherein said second hollow shaft means includes a helical slot and said second linkage means includes a pin which is fixed to said push rod and which extends into said helical slot in said second hollow shaft means.

3. The camera of claim 1 wherein said push rod includes an axial slot in the region of said first hollow shaft means and wherein said first linkage means includes a pin which is fixed to said first hollow shaft means and which extends into said axial slot and wherein said push rod includes a helical slot in the region of said second hollow shaft means and wherein said second linkage means includes a pin which is fixed to said second hollow shaft means and which extends into said helical slot.

4. The video camera of claim 1 including a zoom lens for projecting an image of a scene onto said sensor, said dimensions and configuration of said zoom lens, shutter discs and sensor being optimized so as to make a compact, lightweight, easy to use video camera.

* * * * *